United States Patent [19]
Kuehnel et al.

[11] Patent Number: 5,907,542
[45] Date of Patent: May 25, 1999

[54] DYNAMIC ASSIGNMENT OF SIGNALLING VIRTUAL CHANNELS FOR WIRELESS ATM SYSTEMS

[75] Inventors: Thomas Kuehnel, Bern; Yung-Shain Wu, Studen, both of Switzerland

[73] Assignee: Ascom Tech AG, Bern, Switzerland

[21] Appl. No.: 08/632,101

[22] Filed: Apr. 15, 1996

[51] Int. Cl.$^6$ .................................................. H04Q 7/00
[52] U.S. Cl. ........................ 370/331; 370/397; 455/437; 455/439
[58] Field of Search .................................. 370/331, 339, 370/332, 329, 409, 397, 338, 395, 396, 410; 455/33.1, 33.2, 436, 437, 438, 439; 379/59, 60

[56] References Cited

U.S. PATENT DOCUMENTS

| | | | |
|---|---|---|---|
| 5,539,744 | 7/1996 | Chu et al. | 370/331 |
| 5,553,069 | 9/1996 | Ueno et al. | 370/397 |
| 5,590,125 | 12/1996 | Acampora et al. | 370/397 |
| 5,623,495 | 4/1997 | Eng et al. | 370/397 |
| 5,633,868 | 5/1997 | Baldwin et al. | 370/331 |

FOREIGN PATENT DOCUMENTS

| | | |
|---|---|---|
| 0 577959 | 12/1994 | European Pat. Off. . |
| 0 637185 | 2/1995 | European Pat. Off. . |

OTHER PUBLICATIONS

Fumito Kubota, et al., "A Multiple Access Scheme for Radio Access Loop Carrying Multiple–Service Traffic–Virtual Circuit Multiple Access," *Electronics and Communications in Japan*, Part 1, vol. 74, No. 11, 1991.

Oliver T.W. Yu et al., "Signaling Network Architecture and Transaction Protocols to Support Realtime Connection Rerouting in ATM/B–ISDNs," Department of Electrical Engineering, The University of British Columbia, Vancouver, B.C., Canada, Mar. 24, 1996.

*Primary Examiner*—Ajit Patel
*Attorney, Agent, or Firm*—Birch, Stewart, Kolasch & Birch, LLP

[57] ABSTRACT

A wireless communication system for asynchronous transfer mode includes the dynamic assignment of signalling virtual channels and/or virtual paths for communications between a mobile terminal and a controller or control function. An access point associated with the wireless mobile terminal is transparent for transmitted data and control information. The dynamic assignment of the signalling virtual channel (SVC) takes place in the event of new registration to the system and handover from one access point to another. The protocol uses finite state machines and timers at the mobile terminal and at the control function. For new registrations, an assignment channel is used on a broadcast uplink from the mobile terminal to the control function to request the SVC, while the response from the control function is transmitted on the downlink broadcast channel. The response contains the unique SVCI to be used by the mobile terminal and the control function for further signalling between them. A loss of carrier connection is detected by exchanging alive messages. If there is no response to the alive messages, pending connections are released and assigned SVCs are freed. Handover from one access point to another is initiated by the mobile terminal. A new SVCI is assigned by the control function as part of the messages exchanged during the handover protocol.

44 Claims, 5 Drawing Sheets

FIG. 1
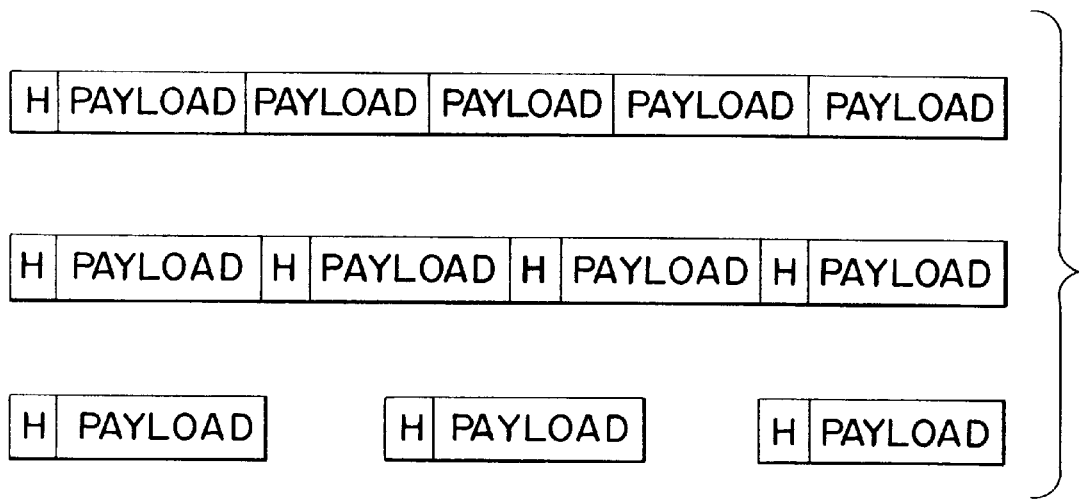
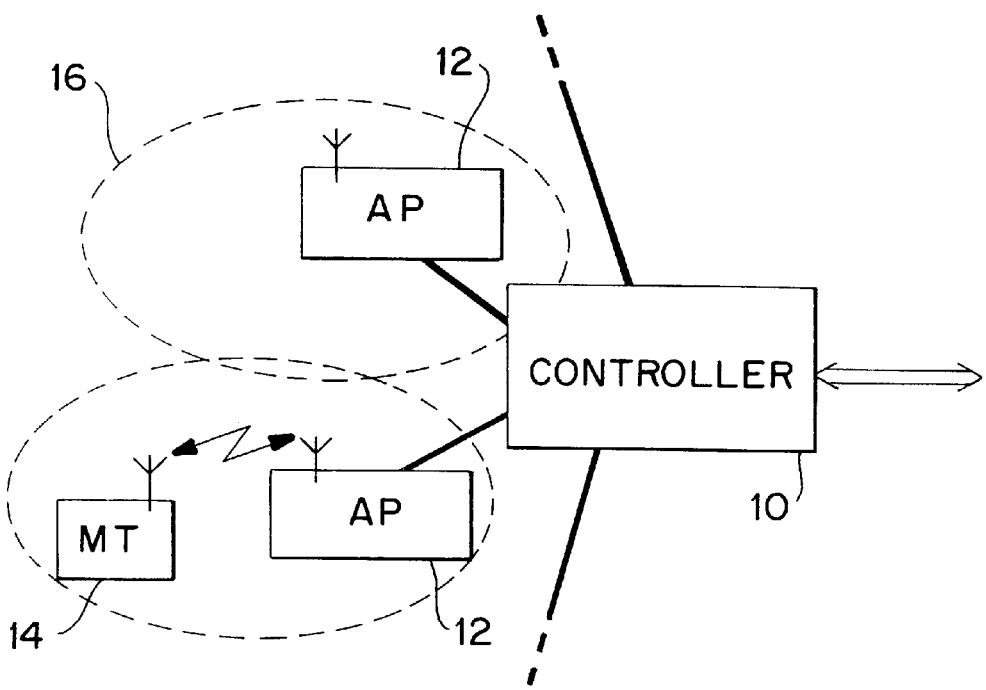
FIG. 2
PRIOR ART

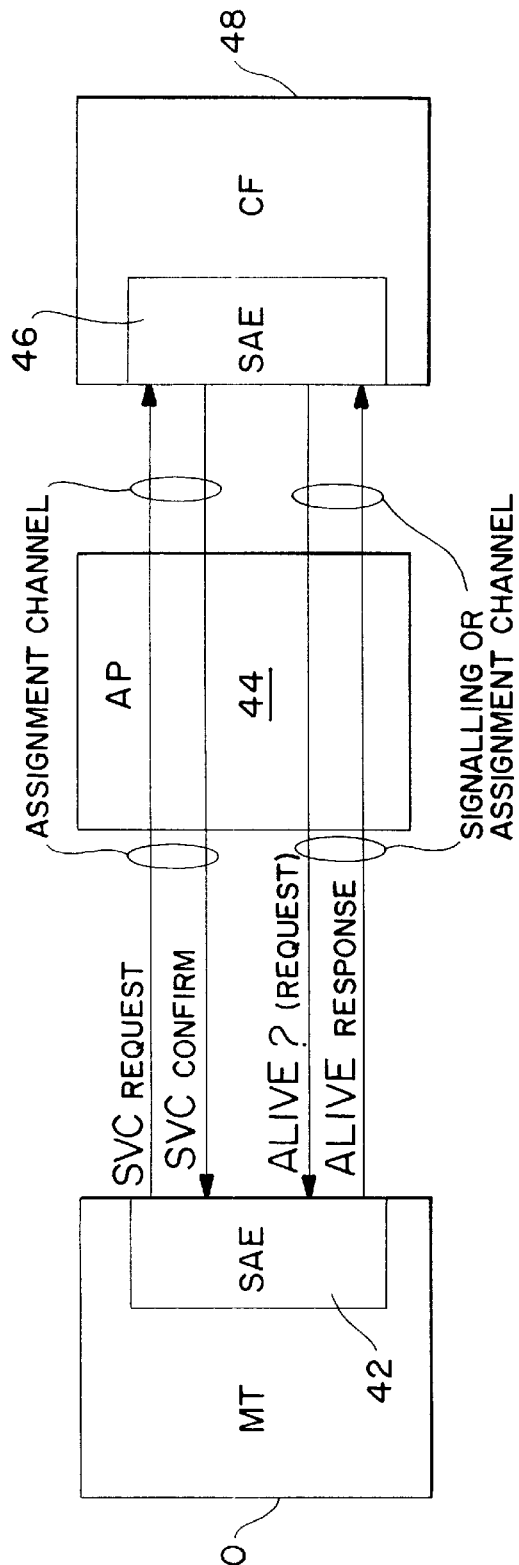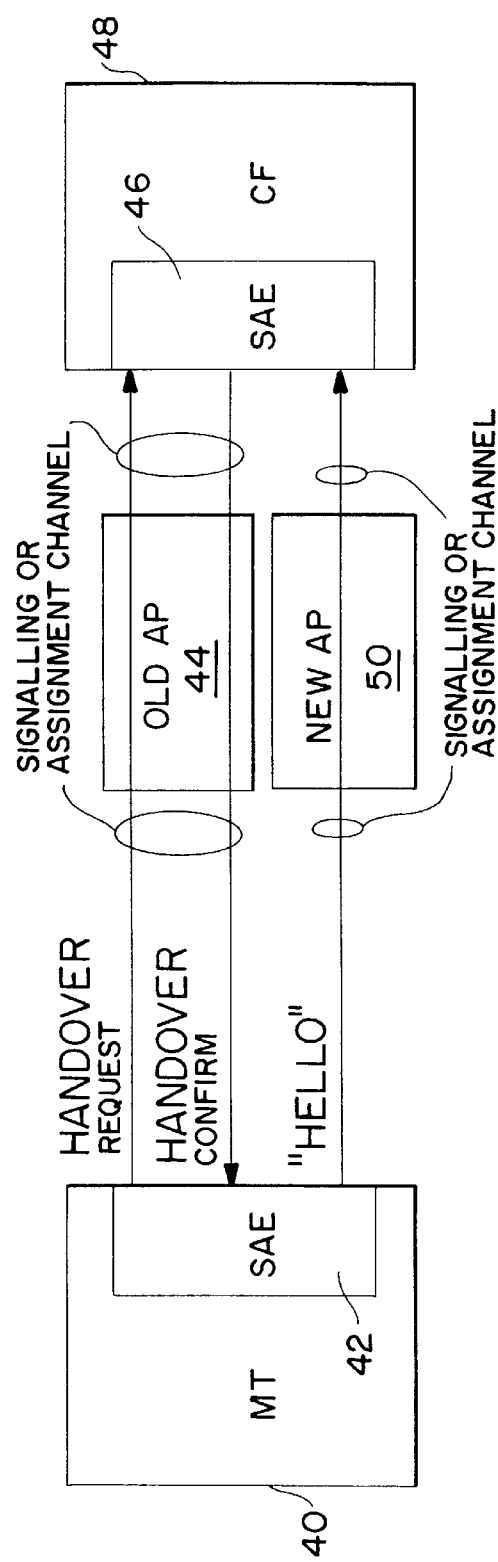

DYNAMIC ASSIGNMENT OF SIGNALLING VIRTUAL CHANNELS FOR WIRELESS ATM SYSTEMS

TECHNICAL FIELD OF THE INVENTION

The present invention relates to telecommunication networks and in particular to wireless (mobile) telecommunication systems using asynchronous transfer mode (ATM) technology. The invention is specially designed for signalling techniques in the wireless ATM network.

BACKGROUND OF THE INVENTION

In recent years, two major developments have been affecting telecommunications technology: broadband communication and mobile communication.

Broadband communication is mainly driven by new multimedia services which require more bandwidth than can be offered by existing network solutions.

ATM (Asynchronous Transfer Mode) is considered the major technology for future development of Broadband Integrated Services Digital Networks (B-ISDN). Standards supported by the International Telecommunications Union as well as the ATM Forum are evolving to allow seamless interworking of equipment and networks which are manufactured and operated by different organizations. The intent behind using ATM is also to create a single network that is able to handle different kinds of telecommunications traffic, including video, data and audio.

An ATM transport network (i.e., a communication network which transmits information using ATM cell packets) is known to include an ATM layer and a physical layer. The ATM layer is based on the virtual path/virtual channel (VP/VC) concept. The VC identifies a unidirectional communication capability through which ATM cells are transported. One or more VCs can be used in a particular virtual path (VP), which also (in general) identifies another level of the communication capability through which the ATM cells are transported.

An ATM cell (as the smallest information unit) includes a header field (5 bytes or octets) and a payload field (48 bytes or octets). The ATM cell header contains the VP and VC identifier(s) used for addressing inside the network (i.e., for routing the information to an intended destination).

Communication in known ATM networks is initiated during a connection setup, after which cells belonging to one connection follow a predetermined path defined by the VPI and VCI on a particular link. The connection control information transferred during setup utilizes a unique Signalling VC (SVC) which is contained in the VP used. It is identified by the pair: virtual path ID (VPI) and virtual channel ID (VCI). The physical layer provides a reliable continuous physical (hardwired) connection between ports of the user side and of the network side.

Mobile communication via wireless interface has gained significant importance for voice and data transmission. Cellular architecture, with its limited coverage areas for each radio cell, allows frequency reuse and therefore accommodates a large number of mobile users. These radio cells can be located statically based on fixed access points using ground-mounted stations or geostationary satellites. The radio cells can also be located dynamically using non-fixed access points such as low earth orbit satellites, for example. To allow mobility of the mobile terminals across the borders of adjacent radio cells, systems typically provide special mechanisms for handover, new registration, and connection-loss.

FIG. 2 illustrates the structure of a known cellular wireless network having a controller 10, a plurality of access points 12, and a mobile terminal 14. Controller 10 can be implemented in a central device, or its functions may be distributed among the access points 12. As the mobile terminals move across the radio cell boundaries 16, ongoing communications continue without impacting the telecommunications connection. Mechanisms for registration of a new mobile terminal, handover of an existing mobile terminal, and loss of connection with a mobile terminal, are all provided. However, the wireless communication connection between the mobile terminal 14 and the controller 10 must be processed (i.e. translated) at the access points 12. The controller must rely on the access points to perform the necessary translations for information passing to/from the mobile terminals. Therefore, the access points require complex processing hardware and software. The result is a costly access point, both in terms of cost and processing time.

In wireless networks, it is known to use electromagnetic (radio or optical) links between mobile terminals (MT) and the network. These electromagnetic links are less reliable than fixed (hardwired) network links. The area of the wireless network is typically split into radio cells, shown in FIG. 2, in order to increase the total capacity of the network and the reduce transmission power. Adjacent radio cells use different frequency domains. Each radio cell is controlled by an access point which typically includes a radio controller responsible for monitoring the electromagnetic transmissions in its access point's frequency domain. One or more access points are controlled by the system controller.

Current telephone networks use synchronous transfer modes in which timeslots are specifically reserved in constant intervals, i.e. transmitter and receiver are synchronized to detect the selected timeslot.

Due to the limited bandwidth in current wireless systems, e.g., GSM, the ability of known systems to handle future bandwidth intensive services is limited as well. Network proposals which offer higher bandwidth lack the interoperability with the future B-ISDN.

The present invention therefore desires to combine both technological directions: ATM and wireless networking. The major hurdle for an integrated solution is that ATM is designed primarily for wired networks. Adaptation of the virtual channel/virtual path (VC/VP) concept, which is inherent in ATM, to the wireless environment is one of the major problems that the present invention attempts to solve.

Accordingly, it is one object of the present invention to provide a system which has an inexpensive and reliable infrastructure with simplified access points (AP).

SUMMARY OF THE INVENTION

It is another object of the present invention to provide a digital radio communication system providing wireless access to an ATM environment, in which system a controller controls wireless communications within a geographical area; a mobile terminal has a wireless communication interface; at least one access point operatively connected to said controller, facilitates wireless communication between the controller and the wireless communication interface of the at least one mobile terminal when the mobile terminal is located within the geographical area, wherein information communicated between the mobile terminal and the controller identifies a signalling virtual channel of the ATM environment.

The objects of the present invention are fulfilled by providing a unique signalling virtual channel identifier (SVCI) for a mobile terminal in a cellular wireless ATM network. The signalling virtual channel (SVC) is used as a control path between the mobile terminal and the controller (or control function CF). In the case of new registration (i.e., introduction of a mobile terminal into the network), or handover from one access point to another access point, or loss of connection, then signalling virtual assignment engines (SAE) of the present invention, located at the mobile terminal and at the controller, invoke certain protocol functions. Messages, such as the mobile terminal's request for a unique signalling (VCI) may be exchanged using a system wide reserved Assignment Channel.

The present invention allows the access points to be transparent for the telecommunications traffic; no translation needs to be performed at the access points.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 illustrates various preferred packet formats to be used in the present invention, including a plurality of cells within a packet at the wireless side of the system;

FIG. 2 shows a known cellular wireless network;

FIG. 4 illustrates the flow of messages between the controller and a mobile terminal during registration, and the exchange of Alive messages;

FIG. 5 illustrates the flow of messages during handover;

DETAILED DESCRIPTION OF THE PREFERRED EMBODIMENTS

Figure 3:
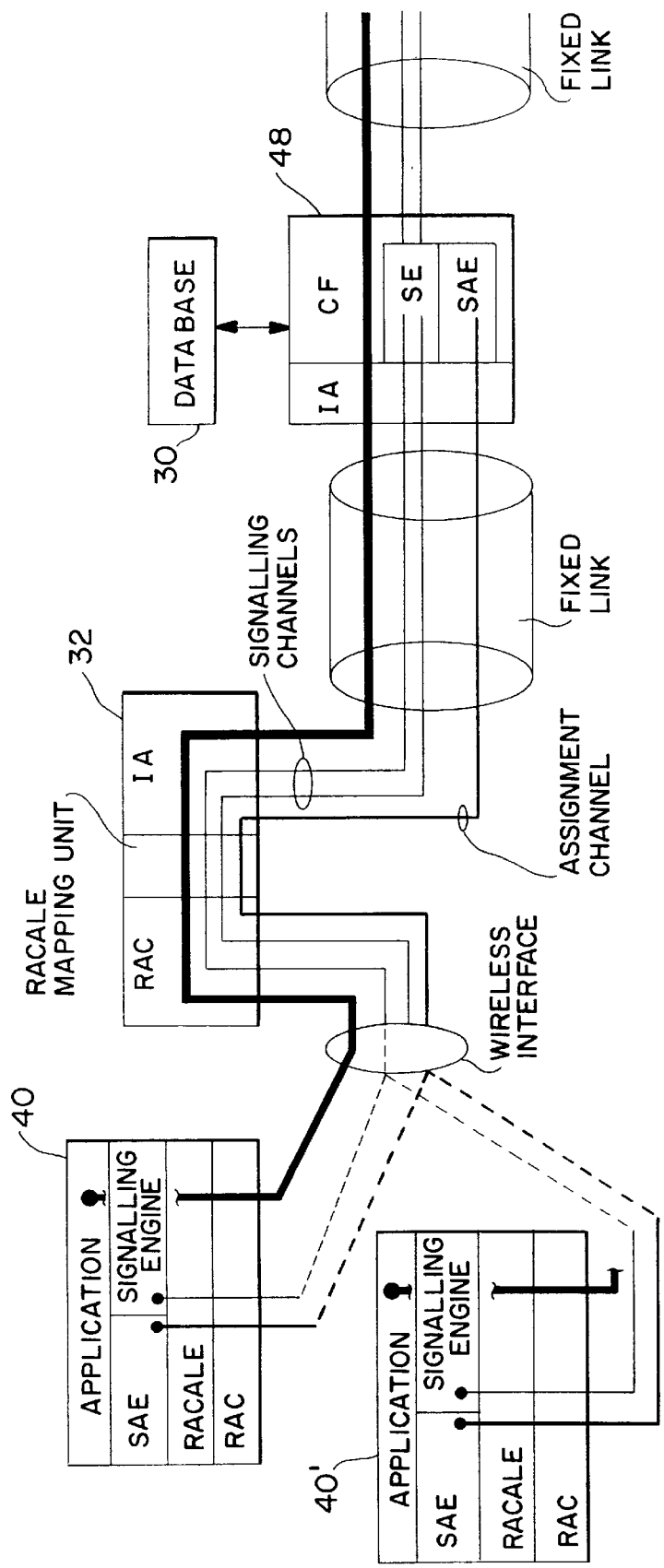
FIG. 3 illustrates the dynamic assignment of signalling VCs in one preferred embodiment of the present invention.

The key to widespread implementation of a wireless ATM network is believed to be the cost efficiency of the system's infrastructure, and its transmission efficiency for the scarce resource of over-the-air interfaces. Cost efficiency includes both monetary and processing-time considerations. In a pico cell environment, the major infrastructure costs are hidden in the access points (AP) of the wireless network, which are necessary for each radio cell. By providing a system having inexpensive and reliable infrastructure, with simplified access points, the present invention clears these key obstacles.

In the present invention, a wireless connection between the system's controller (or "control function") and a mobile terminal is defined by the information (VPI, VCI, port#). VCI and VPI are the Virtual Channel Identifier(s) and Virtual Path Identifier(s), respectively. The port number simply identifies the input/output port through which the controller sends information to a desired access point (AP), this access point being the one associated through the wireless connection to the mobile terminal. The port number cannot be assigned via the air interface to the mobile terminal due to the broadcast transmission behavior of the air interface. The access points are preferably transparent to the communications, used only to organize incoming cells for transmission to the controller or to the mobile terminals. Network elements perform the actual routing of the information once inside the network (i.e. inside the controller and beyond), in a manner known to those skilled in the art.

In wireless communication systems, the efficiency with which available bandwidth is used at the over-the-air interfaces depends on the overhead and the protocol and demodulation schemes used. The architecture of the present invention is independent of the system's radio access controller (RAC), i.e., the protocol and modulation scheme used. Therefore, the present invention places no restriction on the type of RAC to be used.

A unique control or signalling channel is established between the mobile terminal (MT) and the wireless network controller. This signalling channel is used for further communication between the mobile terminal and the controller. These communications might be specifically for control purposes such as signalling for call control and mobility management. The present invention controls the assignment of the virtual path identifier/virtual channel identifier (VPI/VCI) in an efficient way. Different approaches are contemplated.

A first approach contemplated by the present invention is the fixed assignment of the signalling virtual channel identifier (SVCI) between the mobile terminal and its access point, but this requires translating of the address field contained in each ATM cell (VPI/VCI) on the fixed link connecting the access point with the controller. The address field contains, for example, the mobile terminal's address (or "telephone number" in simplified terms). This is necessary to avoid addressing conflicts which can arise on the fixed link which connects the access point with the controller. The VPI/VCI information used for each mobile terminal should be uniquely assigned on the fixed link which connects the access point and the controller. Another option is multiplexing of full messages for the uplink (controller to mobile terminal) and demultiplexing of messages for the downlink direction (mobile terminal to controller). That is, the mobile terminal is given a SVCI which would never change during the lifetime of the connection. As the mobile terminal moves to a radio cell controlled by a different access point, then its associated signalling VC has to be translated into a new unused VCI at this AP or the signalling messages which are multiplexed/demultiplexed at the AP using a new message identifier. The drawback of this approach is the translation or multiplexing necessary at the access point, which leads to increased overhead costs (both in monetary and processing terms) at the access points. Also, the translation or multiplexing tables, respectively, kept inside the access point have to be dynamically updated. This necessarily leads to increased complexity at the access point (AP). This, then, has a negative impact on infrastructure costs, power consumption, and reliability of the overall system.

The present invention therefore preferably employs a dynamic assignment of a unique signalling virtual channel (SVC) between a given mobile terminal MT and the control function CF. This leaves the access points AP transparent for the transmission of data and control information.

The mobile terminal and control function perform a predetermined protocol over a predetermined assignment channel, which has the same VPI and VCI for all mobile terminals in the system. The identity of the control or signalling channel to be used between the mobile terminal and the control function is transferred over this assignment channel, so that subsequent control operations between the mobile terminal and the control function CF can be performed over the control and signalling channel (SVC) which was previously assigned. The dynamic SVC assignment/ reassignment is done efficiently, and is needed in three cases:
(1) registration: a mobile terminal enters a coverage area (radio cell) of an access point AP, or a new mobile terminal is switched "ON".
(2) handover: a mobile terminal moves from one radio cell to another radio cell.
(3) loss of carrier: the connection breaks between the mobile terminal and the access point, or the mobile terminal is switched "OFF".

Each of these cases will be discussed individually in detail.

Registration. Upon association of a mobile terminal to an access point (i.e. establishing a wireless link in a manner known in the art), the mobile terminal broadcasts an SVC Request which is received by the access point. The request is transferred to an SVC assignment engine (SAE) of the control function CF which obtains an available SVC identifier (SVCI) from its internal data base. The structure of this preferred embodiment is shown in FIG. 3. The control function CF returns the new SVCI as part of an SVC Confirm message via the access point using a predetermined downlink broadcast channel. The control function CF reserves internally the SVCI for further signalling with that mobile terminal. After the mobile terminal receives the new SVCI, the mobile terminal can exchange control information (e.g., signalling information) using the SVCI.

The broadcast of the SVC Request by the mobile terminal is done using a predetermined VPI and VCI which identifies an assignment channel reserved in the system specifically for these (and other) requests. The mobile terminal is preferably provided with a microprocessor or other analogous control element.

Figure 6:
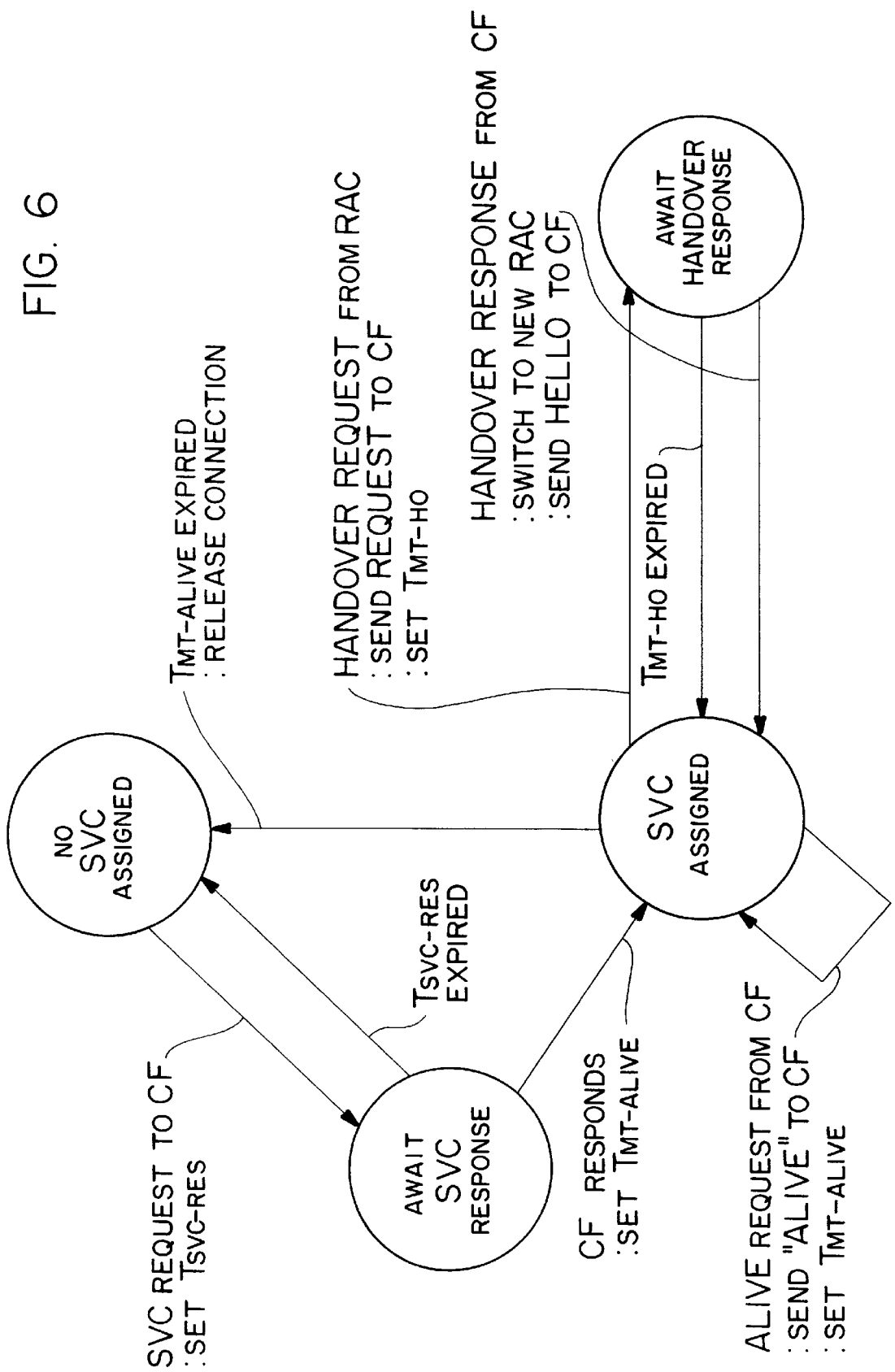
FIG. 6 shows the preferred operation of the SVCI assignment mechanism of the mobile terminal, in a simplified finite state diagram.
Figure 7:
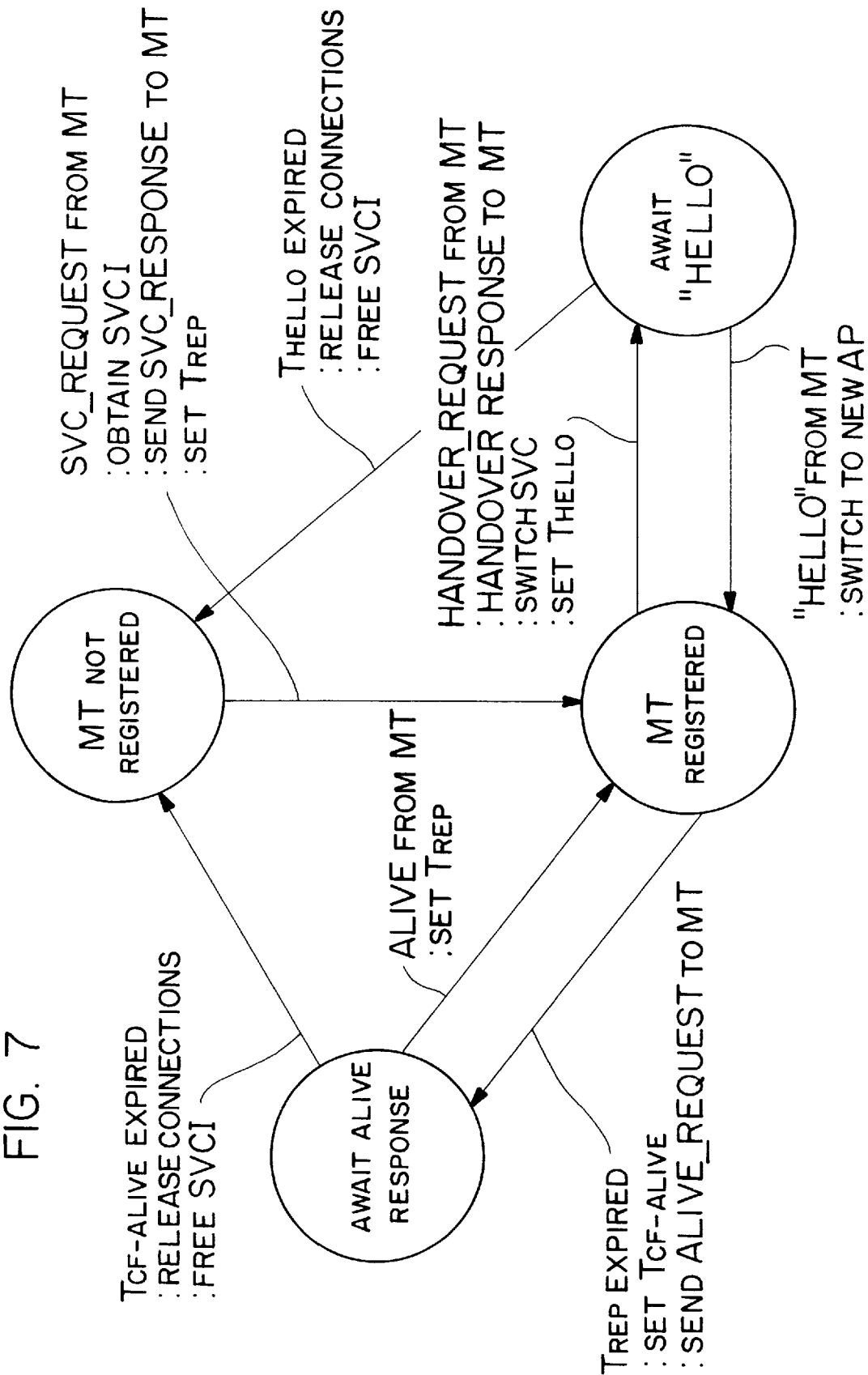
FIG. 7 shows the preferred operation of the SVCI assignment mechanism of the control function, in a simplified finite state diagram.

The mobile terminal is also preferably provided with the ability to monitor the time before hearing a responses from the CF. For example, if the mobile terminal does not receive a response following its SVC Request in a given time ($T_{SVC-RES}$) then it assumes that the Request has failed. See FIGS. 6 and 7, which show the finite state diagrams preferably implemented by finite state machines in the mobile terminal and at the control function. It may reissue a new Request after a predetermined time (not shown in the figures) which may be chosen randomly or derived from the address field to avoid contention of multiple mobile terminals requesting a new SVC at the same time. That is, collisions in the air interface due to more than one mobile terminal requesting a new SVC at any one time, results in undiscernible garbage being received. The controller will not respond, so the mobile terminals try their requests again, this time not simultaneously. They repeat their requests at times chosen randomly or derived from their "telephone numbers" so to speak. The time calculation is generally known, for example in the Ethernet contention resolution algorithm defined in IEEE 802.3. The Request procedure may be repeated several times.

The registration of the mobile terminal may be combined with authentication and accounting. A specific identifier for the mobile terminal, e.g., a mobile terminal ID, may be transmitted along with a security key as part of the SVC Request message. Only upon successful verification will a valid SVC identifier (SVCI) be returned to the mobile terminal from the control function CF. The security key can be used for ciphering and deciphering future information exchanges via the radio interface, thereby improving security of the connection.

The message flow for the registration is shown in FIG. 4. At the top of the figure is shown the SVC Request message sent from the SVC Assignment Engine 42 of the mobile terminal 40. The Request passes through the transparent access point 44 to the SVC Assignment Engine 46 of the control function 48. The SAE 46, after verification of the request, transmits a SVC Confirm message including the identity of the VPI and VCI to be used by the mobile terminal 40 in future transmissions. The VPI and VCI received by the mobile terminal 40 may be stored in a dedicated memory, such as a RAM, or in any other appropriate storage device (not shown).

It is also contemplated that the mobile terminal 40 may transmit a subsequent message over the assignment channel, after receiving the SVC Confirm message, in order to verify that it has correctly decoded the VPI and VCI. The CF may respond with another SVC Confirm message, identical or different from the first Confirm message, or with an SVC Correction message in the event the mobile terminal intends to use an incorrect VPI and VCI.

Handover. Two basic handover situations can be distinguished: Handover I is characterized by an abrupt change without prior notification, and handover II involves an active preparation phase.

Handover I occurs when there is a loss of carrier, thereby requiring a re-registration of the mobile terminal into the network. It is essentially a combination of the Loss of Connection situation (described below) and the Registration situation described above.

Handover II has a preparation phase. The message flow for handover II is illustrated in FIG. 5. In Handover II, handover control information is exchanged through the existing access point 44 with which the mobile terminal is associated, and using the already-established SVC (or the assignment channel, but this is less preferred). When the radio access controller RAC of a particular mobile terminal has decided to perform a handover to another access point 50, the mobile terminal sends a Handover Request message to the control function CF and sets a timer $T_{MT-HO}$ (see FIG. 6) to supervise the handover process. The RAC may initiate the handover protocol due to weakness of the wireless signal from the associated access point, or by external indications that it is relocating into a different radio cell (e.g. through global positioning indications from satellites or other position information). It must be remembered that the present invention contemplates radio cells that are geographically fixed and/or radio cells which are geographically dynamic. Therefore, movement from one radio cell to another does not necessarily mean that the mobile terminal has moved, but merely that the mobile terminal is relocating into another radio cell.

The SAE of the control function CF obtains from the database a new SVC identifier to be used for the new access point association, and returns it as a parameter of the Handover Confirmation message to the requesting mobile terminal. After the confirmation message has been received, the RAC of the mobile terminal switches to the new access point.

If no response has been received before $T_{MT-HO}$ expires, then the mobile terminal assumes the request has failed. It may re-issue another handover request.

Assuming the handover protocol goes smoothly, the control function still does not know at this point which access point the mobile terminal has selected for handover (i.e. where the mobile terminal has moved to). In order to avoid multiple assignments of the same SVCI, the control function returns an SVCI unique to all possible access points with which the mobile terminal might associate with. This is based on the current location of the mobile terminal, and the assumption that it will move only into neighboring radio cells. If there is no conflict of double SVCI assignments in the control function's domain, the mobile terminal can even keep its original SVCI when being handed over to a new access point. In this regard, the system can be designed to guarantee that each SVCI is used only once in the entire domain, i.e. after registration each mobile terminal keeps its assigned SVCI.

After the handover protocol has been performed, the mobile terminal sends a "hello" message. This message allows the control function to determine which access point the mobile terminal is now attached to. If the control function does not receive the hello message in a given time ($T_{HELLO}$) then it assumes the handover has failed and subsequently is clears the pending connections and frees the new SVCI. See FIG. 7. It may also enter a recovery state, in which is reissued a new handover response message.

Since the hello message from the mobile terminal is forwarded to the control function by the newly associated access point, the control function can determine which access point the mobile terminal has become associated with by looking at the port identifier for the incoming hello message. That is, the access points are connected to the control function through specific input/output ports. From then on, the control function uses the new port for communicating with the mobile terminal.

The above procedure makes it unnecessary to include the new access point identifier in the mobile terminal's Handover Request which leads to a further simplification of the access point and the radio access controller (RAC). Otherwise, the mobile terminal MT would have to obtain the identifier of the new access point AP and include it in the Handover Request message. In this case, the new AP is predetermined and the SVCI to be assigned has to be unique only to this AP.

Once the signalling path is established between the mobile terminal MT and the control function CF, additional control messages may be exchanged to adjust the VP identifier or the VC identifier for pending data connections in order to avoid duplicate assignments.

Loss of Connection. To insure that the signalling connection is on-going and valid, the control function of the present invention periodically sends Alive Message requests to the mobile terminal using the existing SVC or the Assignment Channel. If the control function does not receive a response within a given time ($T_{CF-Alive}$) following an Alive Message request, then it assumes the mobile terminal MT is disconnected. See FIG. 7. The time period may be any given time period, from fractions of a second to several minutes, and may be varied depending on the situation. The Loss of Connection protocol may also be suspended by the control function until a suspect situation arises.

If the time period ($T_{CF-Alive}$) expires, the pending connections are released and the SVC identifier is freed for further use. In addition, or as an alternative, the mobile terminal may maintain a timer ($T_{MT-Alive}$) for awaiting incoming Alive Message requests. If the timer times out, then the connection is assumed to be broken. The amount of time $T_{MT-Alive}$ should satisfy the following condition:

$$T_{MT-Alive} > T_{CF-Alive} + T_{frame} + T_{prop} + T_{proc}$$

$T_{frame}$=frame transmission time,
$T_{prop}$=propagation time,
$T_{proc}$=processing time in the mobile terminal MT and in the control function CF.

The flow of the Alive Message protocol is depicted in FIG. 4. After the mobile terminal's signalling virtual assignment engine 42 establishes a signalling virtual channel (SVC) with the control function's SAE 46, then the Alive Message requests may be transmitted by the control function 48 periodically.

If the radio access control part of the access point and the mobile terminal provide a mechanism to detect radio link failures, then it may be possible to configure the system so as not to rely on the Alive Message mechanism. A broken connection may instead be reported directly by the RAC of the access point when the wireless connection is lost.

In order to further insure that a broken connection is indeed broken, the Alive Message mechanism may be repeated several times before a decision is made by the control function that the connection is, in fact, lost. Similarly, if the radio access controller is in charge of the loss-of-connection determination, then the access point may wait before reporting a disconnection, allowing the mobile terminal additional time within which to resume the connection.

As can be seen by the above discussion, the present invention provides messages for Registration, Handover and Alive which are exchanged between mobile terminals and the control function using a VPI/VCI combination that is unique for the entire system. These messages can be as small as one ATM cell payload, and may include error detection/correction codes for the desired fields within the cell. The SVC identifier assigned for each MT-CF association is not, of course, restricted to a specific VP identifier.

As seen in FIG. 3, one mobile terminal may be given several virtual channels on which to transmit application specific information. The assigned signalling channel is dedicated for the exchange of control information (signalling). It can be used by the mobile terminal to obtain a new or additional channel at any required time, not only upon initial registration into the system. The user channel of FIG. 3 can be used to transfer application specific data for the user (user data).

When a new VC identifier for the signalling virtual channel (SVCI) is sent to the mobile terminal, a new VP identifier may also be conveyed by the control function CF. Again, the virtual path is typically hierarchically higher than the virtual channel. One option contemplated by the present invention is to assign a single VP identifier which conveys all connections for the particular mobile terminal MT. Signalling data may be conveyed by the mobile terminal using a predefined VC identifier, preprogrammed into the mobile terminal, within this VP identifier. Similarly, other predefined VCs may be preprogrammed into the mobile terminal for use in transmitting other known types of data. That is, the system may be designed for specific applications, these applications having pre-assigned VCs. The advantage is that, in case of Handover, all connections are switched simultaneously including the Signalling Channel by simply assigning a new or different VP. The management over connections becomes easier because it is performed on a VP basis rather than via individual VCs.

The VPI/VCI information can also be used directly for addressing the RAC. That is, the ATM cell header corresponds to the packet header transmitted to/from the mobile terminal MT. No additional RAC address information is required. As shown in FIG. 1, different cell formats can be used at the radio interface. Packets can be assembled using one or more ATM cell headers and one or more ATM cell payloads. Individual packets may also be sent in series. Various combinations are possible. Assembling and disassembling the transmitted/received cells may be performed at a RAC Adaption Layer Engine (RACALE) which is contained in the mobile terminal MT and the access point AP.

The basic structure of the system according to one preferred embodiment of the present invention is shown in FIG. 3. The control function 48, with its associated database 30, is connected by preferably fixed links (e.g., hardwired) to access points 32 (only one of which is shown in FIG. 3). The access point 32 controls its radio cell so that the control function 48 can communicate with one or more mobile terminals 40, 40'.

The access point 32 is a radio transceiver having a radio interface RAC, appropriate buffers, etc., all controlled by a controller. This controller, as with all engines and other components shown in the figures of the present invention, may be implemented through appropriate hardware circuits and/or hardware and software combinations including but not limited to programmed microprocessors. The access point also serves as a fixed link interface to the controller 48, and performs mapping functions to map received cells from either side (fixed link to/from wireless interface). The RAC may contain capabilities for error correction, transmit power control, receiver sensitivity, etc.

At the access point 32, ATM cells transmitted by the mobile terminals are mapped, without processing, from the RAC to the Interface Adapter (IA) of the fixed link to the control function 48. Similar, but opposite, processing applies for cells traversing the access point in the opposite direction (i.e., from the CF 48 to the access point's IA). The access point 32 is transparent for all connections including signalling. A mapping unit MU included in the access point 48 preferably includes elastic buffers (not shown) for each communication direction, so as to adapt to different and changing transmission speeds at the wireless side versus at the fixed link side. The mapping unit MU is preferably combined with the radio access controller's adaptation layer engine RACALE.

As is readily apparent, the present invention provides several advantages for dynamically assigning signalling virtual channels for a wireless ATM system. By using an access point AP which is completely transparent for data traffic and control traffic, the AP is simplified thereby yielding low infrastructure costs, high reliability, and low power consumption. The access point 32 is preferably implemented using integrated circuits with appropriate communication interfaces and buffers, as outlined above.

Due to the lower power consumption of the inventive access point, its power could be supplied via the fixed connection to the control function 48. That is, the fixed link to the CF may convey electrical energy over the interconnecting wires, such as coaxial cables. Preferably, data and power share the same communication path; the Interface Adapters IA in both the access point and the control function provide filtering functions. This allows data signals in the form of signal transitions (e.g., AC) to be separated from the fixed level (e.g., DC) used to supply power to the access points. The electrical energy fed into the fixed link is supplied by the control function CF.

Also according to the present invention, the maximum number of mobile terminals depends on the number of available VP/VC identifiers. Moreover, the dynamic assignment of signalling VCs according to the present invention does not rely on any specific type of over-the-air communication. Different RAC mechanisms and multiplex schemes may be used without straying from the inventive concepts disclosed herein. It is even possible for a plurality of mobile terminals within a radio cell to share, for example, the same frequency, with the VPI/VCI being used to discriminate between them.

Because the VPI/VCI field of the transmitted ATM cell may be used directly for RAC addressing, the radio resources are used more efficiently. As shown in FIG. 1, one header may accompany more than one cell.

According to another preferred embodiment of the present invention, a single signalling channel may be assigned to more than one mobile terminal. This permits point-to-multipoint signalling to be established. The versatility of the present invention provides for these and other advantages that will become apparent upon review of this disclosure.

As stated previously, there are multiple options available for assigning channels in the present invention. The VPI may be fixed to a predefined value and only the VCIs to be used are conveyed. The VPI/VCI may both be assigned by the control function. The VCIs may keep their values as first assigned (or as predefined) and only the VPI field can be changed (e.g. during handover). There are myriad possibilities with the present invention.

A system implementing the present invention will permit a mobile terminal to communicate over several virtual channels at the same time. For example, different applications (e-mail, www, television, file-load, telephone, etc.) can be simultaneously implemented on different channels.

As an example, there may be 256 virtual paths possible, and each virtual path is further subdivided into 65536 virtual channels. These numbers reflect the address space used: the VPI uses an 8-bit value and the VCI uses a 16-bit value. Both values are part of the address information conveyed in the header of an ATM cell. Not all channels have to be used.

It is noted that no protocol is needed between the access point and the control function, nor between the access point and the mobile terminal, for the exchange of control information. This permits easy implementation of the present invention at the controller and at the mobile terminal. Lower protocol overhead allows the information in an ATM cell payload to be conveyed more efficiently.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A digital radio communication system providing wireless access to an ATM environment, comprising:

a controller for controlling communications within a geographical area;

a mobile terminal having a wireless communication interface;

at least one access point operatively connected to said controller, for facilitating communication between said controller and the wireless communication interface of said at least one mobile terminal when said mobile terminal is located within the geographical area, wherein information communicated between said mobile terminal and said controller identifies a signalling virtual channel of the ATM environment, wherein the controller assigns a new virtual channel to said mobile terminal when said mobile terminal approaches a portion of the geographical area not covered by the access point with which said mobile terminal is currently communicating, wherein said controller transfers the identity of the new virtual channel to the mobile terminal through the access point with which said mobile terminal is currently communicating, and wherein said mobile terminal initiates the transfer of the new virtual channel identifier by transmitting a handover request to said controller, and further wherein said mobile terminal, after receiving the identity of the new virtual channel, controls the wireless communication interface to transmit a hello message such that a new access point receives the hello message and transfers the hello message to the controller, thereby identifying to the controller the new access point.

2. A digital radio communication system providing wireless access to an ATM environment, comprising:

a controller for controlling communications within a geographical area;

a mobile terminal having a wireless communication interface;

at least one access point operatively connected to said controller, for facilitating communication between said controller and the wireless communication interface of said at least one mobile terminal when said mobile terminal is located within the geographical area, wherein information communicated between said mobile terminal and said controller identifies a signalling virtual channel of the ATM environment, said system further comprising:

a processor in said controller for controlling the handover of said mobile terminal to a second access point, the processor receiving a handover request from said mobile terminal and for awaiting a hello message from said mobile terminal through said second access point such that the identity of said second access point is determined after the hello message is received.

3. A process for the dynamic assignment of signalling virtual channels for wireless ATM systems, comprising the steps of:

(a) providing at least one mobile terminal having wireless ATM communication capabilities;

(b) controlling a wireless ATM system within a geographical area;

(c) dynamically assigning signalling virtual channels to the mobile terminal when the mobile terminal is connected to the wireless ATM system;

(d) providing a plurality of access points serving respective geographic areas for the wireless ATM system, to facilitate ATM communication between the mobile terminal and a controller of the wireless ATM system;

(e) assigning a new virtual channel to the mobile terminal when the mobile terminal approaches a new geographical area not covered by the access point with which the mobile terminal is currently communicating;

(f) controlling the mobile terminal to initiate the transfer of the new virtual channel identifier by transmitting a handover request to the controller; and (g) transmitting a hello message from the mobile terminal such that a new access point receives the hello message and transfers the hello message to the controller, thereby identifying the new access point to the controller.

4. The digital radio communications system of claim 1, further comprising:

a signalling virtual channel engine in said at least one mobile terminal, for controlling the wireless communication interface to transmit a request for a signalling virtual channel, the signalling virtual channel to be used in subsequent communications for control purposes from said mobile terminal to said controller.

5. The digital radio communications system of claim 4, wherein said signalling virtual channel assignment engine transmits the request immediately after establishing an initial wireless link with one of said at least one access points.

6. The digital radio communications system of claim 5, wherein the controller assigns, in response to the request, a signalling virtual channel identifier for future use by said mobile terminal and transmits the identifier to the mobile terminal.

7. The digital radio communications system of claim 4, wherein said signalling virtual channel engine controls said wireless communication interface to transmit the request on a predetermined assignment channel, the assignment channel being identified in the request by a predetermined virtual channel identifier and a predetermined virtual path identifier.

8. The digital radio communications system of claim 7, wherein the predetermined virtual channel identifier and the predetermined virtual path identifier are identical for all mobile terminals used in the system.

9. The digital radio communications system of claim 1, further comprising:

a signalling virtual channel engine in said at least one mobile terminal, for controlling the wireless communication interface to transmit information including the identity of a signalling virtual channel assigned by said controller.

10. The digital radio communications system of claim 9, wherein said signalling virtual channel engine in said at least one mobile terminal controls the wireless communication interface to transmit a request for a signalling virtual channel, the request being received by said controller, and wherein said system further comprises:

a signalling virtual channel assignment engine in said controller, for assigning a virtual channel to said mobile terminal in response to the request, the identity of the virtual channel being transmitted to said mobile terminal through one of said at least one access points.

11. The digital radio communications system of claim 9, wherein the transmitted information includes a single ATM header followed immediately by a plurality of ATM cells, the header including the identity of the assigned virtual channel.

12. The digital radio communications system of claim 1, further comprising:

a detector in said mobile terminal for detecting disconnection of communication from said controller, the detector including a timer which is reset by the receipt of a predetermined signal from said controller.

13. The digital radio communications system of claim 1, further comprising:

a circuit in said at least one access point for mapping ATM cells from the controller into radio cells for transmission to the wireless communication interface, and for mapping radio cells from said wireless communication interface for transmission over a hardwired link to said controller.

14. The digital radio communications system of claim 1, wherein the controller assigns a new virtual channel to said mobile terminal when said mobile terminal approaches a portion of the geographical area not covered by the access point with which said mobile terminal is currently communicating.

15. The digital radio communications system of claim 14, wherein said controller transfers the identity of the new virtual channel to the mobile terminal through the access point with which said mobile terminal is currently communicating.

16. The digital radio communications system of claim 1, further comprising:

a signalling virtual channel assignment engine in said controller, for receiving a request for a signalling virtual channel from said mobile terminal, and for assigning a virtual channel to the requesting mobile terminal, the virtual channel already being used by another mobile terminal in said system.

17. The digital radio communications system of claim 1, further comprising:
a memory in said mobile terminal preprogrammed to contain the identifier for the signalling virtual channel; and
a database containing the identities of a plurality of virtual paths, from which said controller chooses a first virtual path to be assigned the mobile terminal, the first virtual path being transmitted to said mobile terminal through said access point.

18. The digital radio communications system of claim 5, further comprising:
a signalling virtual channel assignment engine in said controller, for assigning, in response to the request, a signalling virtual path identifier for future use by said mobile terminal,
wherein the signalling virtual channel identified in the information communicated between said mobile terminal and said controller is a predefined signalling virtual channel known to said mobile terminal.

19. The digital radio communications system of claim 18, wherein said mobile terminal includes additional data connections to said controller, said data connections being transmitted using respective virtual channels within the assigned virtual path.

20. The digital radio communications system of claim 2, further comprising:
a signalling virtual channel engine in said at least one mobile terminal, for controlling the wireless communication interface to transmit a request for a signalling virtual channel, the signalling virtual channel to be used in subsequent communications for control purposes from said mobile terminal to said controller.

21. The digital radio communications system of claim 20, wherein said signalling virtual channel assignment engine transmits the request immediately after establishing an initial wireless link with one of said at least one access points.

22. The digital radio communications system of claim 21, wherein the controller assigns, in response to the request, a signalling virtual channel identifier for future use by said mobile terminal and transmits the identifier to the mobile terminal.

23. The digital radio communications system of claim 20, wherein said signalling virtual channel engine controls said wireless communication interface to transmit the request on a predetermined assignment channel, the assignment channel being identified in the request by a predetermined virtual channel identifier and a predetermined virtual path identifier.

24. The digital radio communications system of claim 23, wherein the predetermined virtual channel identifier and the predetermined virtual path identifier are identical for all mobile terminals used in the system.

25. The digital radio communications system of claim 2, further comprising:
a signalling virtual channel engine in said at least one mobile terminal, for controlling the wireless communication interface to transmit information including the identity of a signalling virtual channel assigned by said controller.

26. The digital radio communications system of claim 25, wherein said signalling virtual channel engine in said at least one mobile terminal controls the wireless communication interface to transmit a request for a signalling virtual channel, the request being received by said controller, and wherein said system further comprises:
a signalling virtual channel assignment engine in said controller, for assigning a virtual channel to said mobile terminal in response to the request, the identity of the virtual channel being transmitted to said mobile terminal through one of said at least one access points.

27. The digital radio communications system of claim 25, wherein the transmitted information includes a single ATM header followed immediately by a plurality of ATM cells, the header including the identity of the assigned virtual channel.

28. The digital radio communications system of claim 2, further comprising:
a detector in said mobile terminal for detecting disconnection of communication from said controller, the detector including a timer which is reset by the receipt of a predetermined signal from said controller.

29. The digital radio communications system of claim 2, further comprising:
a circuit in said at least one access point for mapping ATM cells from the controller into radio cells for transmission to the wireless communication interface, and for mapping radio cells from said wireless communication interface for transmission over a hardwired link to said controller.

30. The digital radio communications system of claim 2, wherein the controller assigns a new virtual channel to said mobile terminal when said mobile terminal approaches a portion of the geographical area not covered by the access point with which said mobile terminal is currently communicating.

31. The digital radio communications system of claim 30, wherein said controller transfers the identity of the new virtual channel to the mobile terminal through the access point with which said mobile terminal is currently communicating.

32. The digital radio communications system of claim 2, further comprising:
a signalling virtual channel assignment engine in said controller, for receiving a request for a signalling virtual channel from said mobile terminal, and for assigning a virtual channel to the requesting mobile terminal, the virtual channel already being used by another mobile terminal in said system.

33. The digital radio communications system of claim 2, further comprising:
a memory in said mobile terminal preprogrammed to contain the identifier for the signalling virtual channel; and
a database containing the identities of a plurality of virtual paths, from which said controller chooses a first virtual path to be assigned the mobile terminal, the first virtual path being transmitted to said mobile terminal through said access point.

34. The digital radio communications system of claim 21, further comprising:
a signalling virtual channel assignment engine in said controller, for assigning, in response to the request, a signalling virtual path identifier for future use by said mobile terminal,
wherein the signalling virtual channel identified in the information communicated between said mobile terminal and said controller is a predefined signalling virtual channel known to said mobile terminal.

35. The digital radio communications system of claim 34, wherein said mobile terminal includes additional data connections to said controller, said data connections being transmitted using respective virtual channels within the assigned virtual path.

36. The process of claim 3, wherein the mobile terminal includes a plurality of data connections to a controller of the wireless ATM system, the dynamically assigned virtual channel of the step (c) being for use by one of the plurality of data connections.

37. The process of claim 3, further comprising the step of:
   (d) transmitting information between the mobile terminal and the controller, the information identifying the assigned virtual channel of the ATM environment and including a single ATM header followed immediately by a plurality of ATM cells, the header including the identity of the assigned virtual channel.

38. The process of claim 3, further comprising the step of:
   (d) controlling a signalling virtual channel engine of the mobile terminal to transmit a request for a signalling virtual channel.

39. The process of claim 38, wherein the request of the step (d) is transmitted immediately upon establishing a wireless communication link to the wireless ATM system.

40. The process of claim 39, wherein the dynamic assignment of the virtual channel in the step (c) in done in response to the request of the step (d).

41. The process of claim 3, wherein the virtual channel assigned to the mobile terminal in the step (c) is common to a plurality of mobile terminal connected to the ATM system.

42. The process of claim 3, further comprising the step of:
   (d) transmitting the assigned virtual channel identifier to the mobile terminal using a predetermined assignment channel.

43. The process of claim 3, further comprising the step of:
   (d) detecting disconnection of the mobile terminal from the wireless ATM system by providing a timer in the mobile terminal, and resetting the timer upon receipt of a predetermined signal.

44. The process of claim 3, further comprising the steps of:
   (d) mapping ATM cells from the controller of the wireless ATM system into radio cells for transmission to the mobile terminal, and mapping radio cells from the mobile terminal for transmission over a hardwired link to the controller.

* * * * *